United States Patent [19]

Porter

[11] 4,045,838
[45] Sept. 6, 1977

[54] SURFACE LAYER FOR WINDSHIELD WIPER BLADES

[75] Inventor: Raymond P. Porter, North Dartmouth, Mass.

[73] Assignee: Acushnet Company, New Bedford, Mass.

[21] Appl. No.: 667,163

[22] Filed: Mar. 15, 1976

[51] Int. Cl.² .............................................. B60S 1/38
[52] U.S. Cl. ................. 15/250.36; 264/340; 300/21
[58] Field of Search .................. 15/250.36–250.42; 428/492; 260/42.27; 300/21; 264/340

[56] References Cited

U.S. PATENT DOCUMENTS

| | | | |
|---|---|---|---|
| 1,928,988 | 10/1933 | Watkins | 428/492 |
| 2,908,028 | 10/1959 | Runton et al. | 15/250.36 |
| 2,971,209 | 2/1961 | Coulter | 15/250.36 |
| 3,001,221 | 9/1961 | Wojciechowski | 15/250.36 |
| 3,035,297 | 5/1962 | Overman et al. | 15/250.36 |
| 3,345,348 | 10/1967 | Tennenhouse | 260/42.27 |
| 3,882,567 | 5/1975 | Herzog | 15/250.36 |

*Primary Examiner*—Peter Feldman
*Attorney, Agent, or Firm*—Eyre, Mann, Lucas & Just

[57] ABSTRACT

An improved windshield wiper blade is disclosed. The lip surface of a flexible windshield wiper blade having a low coefficient of friction is coated with an effective thickness of a coating material selected from the group consisting of elastomeric and plastic materials having a Young's modulus of from about $10^6$ to about $10^{11}$. The treated blade exhibits substantially better wipe, wear and friction qualities than untreated blades.

23 Claims, 1 Drawing Figure

U.S. Patent  Sept. 6, 1977  4,045,838
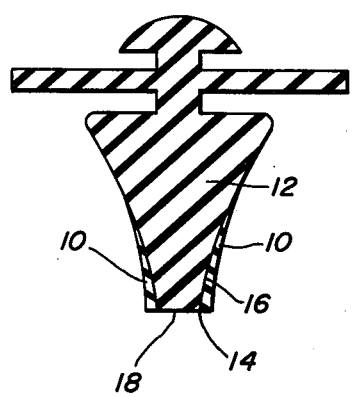

SURFACE LAYER FOR WINDSHIELD WIPER BLADES

The present invention relates to windshield wiper blades and more particularly to the coating of the surfaces of the blades with elastomeric or plastic materials whereby wipe characteristics are improved.

It is well known by anyone who has driven a truck or an automobile, especially under so-called "misty" conditions, that the wipe of a windshield wiper blade is far from acceptable. It is further known that when a windshield wiper blade is used under these conditions for any period of time, it quickly wears at least with respect to any effective wipe which it gives. This will commonly result in streaking of the windshield.

There have been a myriad of attempts to improve windshield wiper blades by varying the blade holder design, the blade configuration, chemical treatment of the blade, and many other ways have also been tried to improve windshield wiper blades. However, none of these has been totally effective especially where the blade is frequently subjected to misty conditions.

In accordance with the present invention, it has been found that coating of low friction wiper blades with an effective thickness of a coating material selected from the group consisting of elastomeric and plastic materials having a Young's modulus of from about $10^6$ to about $10^{11}$ will substantially improve the wipe properties of the blade. The coatings can be applied in a variety of ways including depositing them from solution by spraying, with a paint brush, through use of various mechanical devices, dipping, etc. It is not necessary that the entire surface of the wiper blade be coated and in fact it is considered of advantage to coat only the sides of the lip portion of the wiper blade.

Windshield wiper blades are ordinarily molded from a wide of elastomers including natural and synthetic rubbers. After the basic blade is formed, it is generally treated with a halogen, usually chlorine for the purpose of hardening the surface of the rubber in order to reduce friction of the wiper blade on the windshield and improve wear. Following this treatment the basic blade is sometimes graphited to further reduce friction. The basic blade is then ordinarily cut to form the wiper blade lip and the completed wiper blade element.

In accordance with the present invention, a wiper blade is first formed, suitably by molding. This wiper blade can be any elastomeric material such as natural or synthetic polyisoprene, butadiene, ethylene-propylenediene rubber, neoprene or the like or blends of the foregoing. In accordance with the present invention, the formed windshield wiper blade preferably comprises at least 50% polyisoprene, either natural or synthetic or a blend of the two.

After formation of the basic blade, the blade is treated, if necessary, to reduce the coefficient of friction of the surface thereof. As is known, the coefficient of friction of a windshield wiper blade is the ratio of tangential stress to vertical stress. In accordance with the present invention, the surface of the basic windshield wiper blade either because of its inherent characteristics or because of treatment has a coefficient of friction no greater than about 2.1 according to Friction Test CFRP 113. It is preferred that the coefficient of friction be no greater than about 1.5 according to the said test and best results are obtained when the coefficient of friction is about 1.0 or lower.

Friction Test CFRP 113 has been developed by the applicant for the purpose of measuring the coefficient of friction of windshield wiper blades. Standard tests such as ASTM test for coefficient of friction have been found not to be suitable since they do not take into account the contact surface, contact angle, superstructure pressure and similar matters indigenous to windshield wiper blades. Friction Test CFRP 113 is as follows:

Wiper blade friction was measured using a strain gauged wiper arm. Output of the strain gauges were wired to a B & F signal conditioning and amplifier unit. Output from the amplifier was fed to a Bell & Howell Oscillograph where it was displayed on chart paper. A set of strain gauges located on the horizontal surfaces of the rod-like portion of the wiper arm was used to measure wiper arm force. A set of strain gauges located on the vertical surfaces of the rod-like portion of the wiper arm was used to measure tractive forces. The two sets of strain gauges were calibrated with weights. In making measurements, the windshield was thoroughly washed. The wiper blade was then set in motion and readings were taken after 500 dry abrasion cycles. This slight use before taking measurements suffices to condition the glass surface with material exuded or worn off the wiper blades and to smooth out the wiper blade edge by wearing off any raggedness caused by the cutter.

In some instances, e.g., neoprene, the coefficient of friction of the blade will be low enough in accordance with the present invention that no treatment to reduce surface friction is required. However, most blade materials will require some treatment in order to reduce surface friction. For typical windshield wiper blades such as those made of polyisoprene, halogenation with either chlorine or bromine, a very well known procedure is suitably employed, see for example U.S. Pat. No. 3,035,297. It is also possible to reduce the friction of the surface of blades by treatment with an inorganic acid such as nitric acid or sulfuric acid by employing a concentrated acid at room temperature for a relatively short period of time, e.g., 2 minutes.

Still another way to treat the surface of the formed blade to reduce friction is to apply a hard coating to the surface thereof. This is especially desirable with blades such as those made out of ethylene-propylenediene rubber where halogenation is ineffective to increase surface hardness. These methods of depositing a hardened layer on the surface of a formed blade thereby to increase surface hardness of the blade are well known in the art, see for example U.S. Pat. No. 3,001,221 and British Patent Specification No. 1,090,162.

After the formed blade of the present invention has the proper coefficient of friction, there is applied to the surface of the blade a coating comprising at least one material selected from the group consisting of those elastomeric and plastic materials having a Young's modulus of from about $10^6$ to about $10^{11}$ dynes/cm$^2$. It will be appreciated that the coating can comprise a plurality of materials having the specified Young's modulus and can further include minor amounts of additional additive materials such as finely divided materials (e.g., graphite, titanium dioxide, molybdenum disulfide, etc.) to reduce friction, ultraviolet light absorbers, coloring agents and the like.

According to the present invention, the coating material is applied at least to the sides of the lip of the blade (i.e., the blade lip) but may also be applied to the entire blade if desired. The advantage to not coating other than the lip portion is that this will leave the neck portion of the blade of low surface friction which makes it considerably easier to insert the flexor. The lip edge may also be coated if desired. However, since it is desirable for manufacturing reasons to apply the coating of the present invention before cutting of the blades, the edge of the lip will not usually be coated. As shown in the drawing, the coating 10 (greatly exaggerated in thickness so as to be visible) on the wiper blade 12 extends all the way to the lip edge 14 between the side of the lip 16 and the edge face 18. The coating 10 is shown terminating about half way up the side wall of the lip since, as previously explained, it is preferred that it not extend to the area of the flexor.

The thickness of the coating material to be applied varies very greatly depending upon the substrate to which it is being applied and the coating material itself. As discussed more fully hereinafter, it is believed that it is desirable for the coating material to wear away quite quickly as compared to the substrate on which it is applied and this is borne out by the fact that soft coatings usually work better than hard coatings. For best results, the coating material should be softer than the surface of the substrate. It will be appreciated that in those instances where the surface of the substrate material is hardened to reduce surface friction, the substrate material, if otherwise suitable, can be employed for the coating since the material of the substrate itself will be considerably softer than the hardened surface of the substrate. The optimum thickness for any particular coating material on any particular blade can be readily determined by those of ordinary skill in the art. The coating will normally have an average thickness of from two to about 20 microns.

It is pointed out that even though the coating according to the present invention may be comparatively soft or may be applied in a very thin layer, the wiper blade will continue to be effective to reduce streaks even after the coating layer has been worn away at the operative edge and in many cases will give a better wipe after it has been worn down to the level of the basic blade. It is not completely understood why this phenomenon takes place, but it is believed that after a given number of wipe cycles the wiper blade will be riding partly on the coating material and partly on the underlying blade. It is believed that the coating enables the windshield wiper blade to conform sooner to a particular windshield to form a good seal thereon.

A number of examples were carried out to demonstrate the various aspects of the present invention. In each case a windshield wiper blade was used which was composed of natural polyisoprene, zinc oxide, carbon black, sulfur as a vulcanizing agent and the usual accelerators, antioxidants, etc. These blades are typical of those commercially available. Except as otherwise specified in a particular Example, each blade was halogenated in known manner (see for example U.S. Pat. No. 3,035,297). Some of the blades were then graphited whereas others were coated in accordance with the present invention followed by heating at slightly elevated temperatures to remove solvent. These were then graphited. Both the coated and non-coated blades were then cut to form the blade lip and completed wiper blade element and were tested according to Wipe Test WT-1 developed by applicant as follows:

Wipe Test WT-1 is performed using a conventional Ford "Galaxie 500" windshield and windshield wiper system. Wiper arm forces appropriate to this wiper system are employed. The tests are carried out by allowing the wiper blade to traverse the windshield wetted by means of a nozzle located above the windshield. After a number of passages of the blade, the wiper is stopped near one end of its stroke. The water is then shut off, after which the wiper is caused to pass over the windshield one time and stopped at the end of the stroke. The number of streaks left by the wiper blade are then immediately counted and recorded. The procedure is repeated but with the wiper blade initially at the opposite end of the stroke so that the number of streaks left during the upstroke and downstroke portions of the wipe cycle can be separately determined. The streaks from each stroke are counted and added together to give the total number of streaks left in a complete wipe cycle. The WT-1 test results are given in each of the examples by absolute values or by comparison values.

It must be appreciated that there are very appreciable differences in wipe characteristics of wiper blades obtained from different lots of manufactured blades. These differences are occasioned by the sharpness of the cutter used in forming the blade lip, the particular uncontrollable conditions under which the blade is made, the age of the blade and other similar factors. In order to make the wipe characteristics the same for comparison purposes in the examples, all of the blades within a particular example were taken from the same batch. Blades from the same batch will have the same wipe characteristics. However, not all of the blades in all of the examples were taken from the same batch. Therefore, comparisons of wipe characteristics can only be made within a particular example and no comparisons can be made with the wipe results of a different example.

In the following examples, a number of products are identified by the trademark M-COAT as well as by generic description. These products are available from MicroMeasurements of Romulus, Mich.

EXAMPLE 1

A wiper blade was coated using M-COAT B. This product is a nitrile rubber solution used for making nitrile rubber coatings. The M-COAT B was diluted at a 1:4 ratio in methyl ethyl ketone and was then applied with a paint brush. After curing for 30 minutes at 56° C. to remove solvent the wiper blade was tested in the wipe test. It gave 12 streaks. Two similar wiper blades from the same lot of blades that had not been coated according to the present invention gave 52 and 43 streaks respectively. Three additional wiper blades were painted with this solution. After drying to remove solvent they were tested in wipe tests. They gave 8, 11 and 7 respectively whereas noncoated blades from the same lot of blades gave 50 and 33 streaks in wipe tests.

EXAMPLE 2

Wiper blades were coated using M-COAT C. This product is a silicone rubber solution used for making silicone rubber coatings. The M-COAT C was diluted at a 1:2 ratio in methyl ethyl ketone and was then applied with a paint brush. After curing for 30 minutes at 56° C. to remove solvent the wiper blades were tested in the wipe tests. They gave 15 and 12 streaks respectively. Two similar wiper blades from the same lot of blades that had not been coated according to the present invention gave 60 and 67 streaks respectively in the wipe tests.

EXAMPLE 3

Wiper blades were coated using M-COAT G. This product is a polysulfide rubber solution used for making polysulfide rubber coatings. The M-COAT G was diluted in methyl isobutyl ketone and then applied with a paint brush. After curing for 30 minutes at 56° C. to remove solvent the wiper blades were tested in wipe tests. They gave 21 and 51 streaks respectively. Two similar wiper blades from the same lot of blades that had not been coated according to the present invention gave 72 and 79 streaks respectively in wipe tests.

EXAMPLE 4

Wiper blades were coated using M-COAT A. This product is a urethane solution used for making urethane coatings. The M-COAT A was diluted at a 1:2 ratio in methyl ethyl ketone and was then applied with a paint brush. After curing for 30 minutes at 56° C. to remove solvent the wiper blades were tested in wipe tests. They gave 18 and 52 streaks respectively. Two similar wiper blades from the same lot of blades that had not been coated according to the present invention gave 89 and 86 streaks respectively in the wipe tests.

EXAMPLE 5

Wiper blades were coated using M-COAT B. The M-COAT B was diluted at a 1:10 ratio in methyl ethyl ketone and was then applied with a "Paint Striper." The device applies paint by means of a rotating fluted brass wheel. After curing for 45 minutes at 56° C. to remove solvent the wiper blades were tested in wipe tests. They gave 15 and 23 streaks respectively. Three similar blades from the same lot of blades that had not been coated according to the present invention gave 117, 139 and 136 streaks respectively in the wipe tests.

EXAMPLE 6

A wiper blade was coated using M-COAT C. The M-COAT C was diluted at a 1:10 ratio in methyl isobutyl ketone and was then applied with a Paint Striper. After curing for one hour at 56° C. to remove solvent the wiper blade was tested in the wipe test. It gave 31 streaks compared to 146 streaks for an uncoated blade from the same lot of blades.

EXAMPLE 7

A number of wiper blades were coated using M-COAT B. The M-COAT B was diluted at a 1:2 ratio in methyl isobutyl ketone and was then applied by spraying. After curing for 5 minutes at 80° C. to remove solvent, the wipe of these blades was tested in wipe tests and compared to those of similar blades, from the same lot of blades, that had not been coated according to the present invention. The test results showed the uncoated blades gave about 3 times as many streaks as the coated ones.

EXAMPLE 8

Wiper blades were coated with Bostik Adhesive 2748, a soft rubbery material available from B. B. Chemical Company, Cambridge, Mass. The Bostik Adhesive 2748 was diluted at a 1:2 ratio in methyl isobutyl ketone and was then applied by spraying. After curing for 7 minutes at 80° C. to remove solvent, the wipe of these coated blades was tested in wipe tests and compared to those of similar wiper blades that had not been coated according to the present invention. These blades came from the same lot of blades to which the coatings had been applied. The test results showed that the uncoated blades gave twice as many streaks as the coated ones.

EXAMPLE 9

A number of wiper blades were coated using a neoprene rubber solution. The solution consisted of 2.66 grams per liter of Neoprene W (available from DuPont) and 0.63 grams per liter of Cure Agent C. Cure Agent C consists of 19% by weight 2-mercapto benzo thiazyl disulfide, 46% by weight zinc oxide, 1% by weight soyalecithin, and 34% by weight petroleum oil. The carrier was a mixture of 10% by volume methyl ethyl ketone and 90% by volume toluene. The solution was applied by spraying. After curing for 1 hour at 80° C. to remove solvent and to cure the rubber coatings the thickness of the coating was measured and was found to be about $40 \times 10^{-5}$ cm. The blade was tested in wipe tests and compared to similar blades from the same lot of blades that had not been coated. The coated blades showed no improvement in wipe over the uncoated ones. Both the coated and uncoated blades were then allowed to traverse the dry windshield for 100 cycles so as to slightly wear the coating and simulate blade use. The wipe of the coated and uncoated blades was again tested in wipe tests. It was found that the wipe of the coated blades improved significantly and the uncoated blades now gave 50% more streaks than the coated ones.

The same rubber and curing system was used to coat wiper blades except that a different solvent system was used. Whereas in the previous test the solvent system consisted of 10% by volume methyl ethyl ketone and 90% by volume toluene, the solvent system in this case consisted of 54% by volume methyl ethyl ketone and 46% by volume toluene. The rubber solution was again applied by spraying. After curing for 1 hour at 80° C to remove solvent and to cure the rubber coatings the thickness of the coating was measured and was found to be about $155 \times 10^{-5}$ cm. The blade was tested in wipe tests and compared to similar blades from the same lot of blades that had not be coated. The coat blades showed no improvement in wipe tests over the uncoated ones. Both the coated and uncoated blades were then allowed to traverse the dry windshield for 100 cycles. Wipe of both the coated and uncoated blades was again tested in wipe tests. The uncoated blades now gave three times as many streaks as the coated ones.

EXAMPLE 10

A number of wiper blades were coated using a nitrile butadiene rubber solution. The solution consisted of 10.43 grams per liter of Hycar 1432 (available from Goodrich) and 0.156 grams per liter of Cure Agent C. The solvent was mixture of methyl ethyl ketone and toluene and was 52.5% by volume methyl ethyl ketone. The solution was applied by spraying. After curing at 80° C. for 1 hour to remove solvent and to cure the rubber coatings, the thickness of the coating was measured and was found to be about $40 \times 10^{-5}$ cm. The wipe was tested in wipe tests and compared to similar blades from the same lot of blades that had not been coated according to the present invention. The wipe tests showed the uncoated blades to give about 1.5 times as many streaks as the coated ones on initial wipe and also after 100 and 500 dry wipe cycles.

At a second thickness level and with the Cure Agent C level raised to 0.625 grams per liter, uncoated blades initially gave 1.5 times as many streaks as coated ones having a coating thickness of 25 $\times 10^{-5}$ cm. from the same lot of blades. After 100 cycles on a dry windshield the uncoated blades gave two times as many streaks in wipe tests as did the coated ones and after 500 cycles on a dry windshield three times as many.

EXAMPLE 11

A number of wiper blades were coated using a chlorosulfonated polyethylene solution. This solution consisted of 28.8 grams per liter of Hypalon 20 (available from DuPont), 3.73 grams per liter of 2-mercapto benzo thiazyl disulfide, and 11.5 grams per liter of stannous octoate. The carrier system was a mixture of methyl ethyl ketone and toluene with the methyl ethyl ketone present in the amount of 45% by volume. This gives a waxy solid-like material. The coating was applied by spraying. After curing at 80° C. for 1 hour to remove solvent and to cure the coating, the thickness of the coating was measured and was found to be about 35 $\times$ $10^{-5}$ cm. The blade wipe was tested in wipe tests and compared to similar blades from the same lot of blades that had not been coated according to the present invention. The wipe tests showed the uncoated blades gave two times as many streaks as the coated ones.

EXAMPLE 12

A number of wiper blades were coated using a butyl rubber solution. The solution consisted of 18.1 grams per liter of Butyl 402 (available from Polysar), 2.26 grams per liter of Cure Agent C and 0.91 cubic centimeters per liter of Activator A (an activator containing 6% by weight cobalt as cobalt naphthenate in mineral spirits). The solvent was a mixture of toluene and cyclohexane and was 9.75% toluene. The coatings were applied by spraying. After curing at 80° C. for 1 hour to remove solvent and to cure the rubber coatings, the thickness of the coating was measured and was found to be in the range from about 45 $\times$ $10^{-5}$ to 85 $\times$ $10^{-5}$ cm. The coated blades and a number of uncoated blades from the same lot of blades were abraded for 100 wipe cycles on a dry windshield. Wipe given by the blades was tested in the wipe tests. The uncoated blades gave nearly three times as many streaks as did the coated blades.

EXAMPLE 13

A number of wiper blades were coated using a natural rubber solution. The solution consisted of 9.97 grams per liter of natural rubber and 1.25 grams per liter of Cure Agent C. The solvent ws a mixture of methyl ethyl ketone and toluene containing 47.5% methyl ethyl ketone by volume. The coatings were applied by spraying. After curing at 80° C. for 1 hour to remove solvent and to cure the rubber coatings, the thickness of the coating was measured and was found to be in the range from about 10 $\times$ $10^{-5}$ cm. to 45 $\times$ $10^{-5}$ cm. The coated blades and a number of uncoated blades from the same lot of blades were abraded for 100 wipe cycles on a dry windshield. Wipe given by the blades was tested in the wipe test. The uncoated blades gave two times as many streaks as did the coated blades.

EXAMPLE 14

A number of wiper blades were coated using a styrenebutadiene rubber solution. The solution consisted of 9.97 grams per liter of SBR 1503 (available from Phillips Petroleum) and 1.25 grams per liter of Cure Agent C. The solvent was a mixture of methyl ethyl ketone and toluene containing 47.5% methyl ethyl ketone by volume. The coatings were applied by spraying. After curing at 80° C. for 1 hour to remove solvent and to cure the rubber coatings, the thickness of the coating was measured and was found to be about 80 $\times$ $10^{-5}$ cm. These wiper blades and uncoated wiper blades from the same lot of blades were tested in the wipe test. The uncoated blades gave 3.5 times as many streaks as did the coated blades. Both the coated and uncoated blades were abraded for 100 wipe cycles on a dry windshield. They were again tested in the wipe test. The uncoated blades now gave 4.3 times as many streaks as did the coated blades. Both the coated and uncoated blades were abraded for an additional 400 wipe cycles on a dry windshield. They were tested in the wipe test. The uncoated blades still gave 4.3 times as many streaks as did the coated blades.

EXAMPLE 15

A number of wiper blades were coated using a similar styrene-butadiene rubber solution to that used in Example 14. The solution consisted of 26.8 grams per liter of SBR 1503, 3.34 grams per liter of Cure Agent C and 1.34 cubic centimeters per liter of Activator A. The solvent was a mixture of methyl ethyl ketone and toluene containing 57.0 methyl ethyl ketone by volume. The coatings were applied by spraying. After curing at 80° C. for 1 hour to remove solvent and to cure the ruber coatings, the thickness of the coating was measured and was found to be about 70 $\times$ $10^{-5}$ cm. These wiper blades and a number of uncoated wiper blades from the same lot of blades were abraded against a dry windshield for 100 wipe cycles. Wipe given by the blades was tested in the wipe tests. The uncoated blades gave 6.5 times as many streaks as did the coated blades. A number of additional wiper blades were coated in the same manner and the thickness of the coating ranged from 100 $\times$ $10^{-5}$ cm. After abrading the coated and uncoated blades from the same lot of blades for 100 cycles on a dry windshield, they were tested in the wipe test. The uncoated blades gave 14 times as many streaks as did the coated blades.

A number of additional wiper blades were coated using the solution described above. The coating was again applied by spraying. After drying to remove solvent and to cure the rubber coatings, the thickness of the coating was measured and was found to be about 80 $\times$ $10^{-5}$ cm. These wiper blades and a number of uncoated wiper blades from the same lot of blades were tested in the wipe test. The uncoated blades gave 3.5 times as many streaks as did the coated blades. Both the coated and uncoated blades were abraded for 100 wipe cycles on a dry windshield. They were again tested in the wipe test. The uncoated blades now gave five times as many streaks as did the coated blades. Both the coated and uncoated blades were abraded for an additional 400 wipe cycles on a dry windshield. They were tested in the wipe test. The uncoated blades now gave four times as many streaks as did the coated blades. The coated blades gave about five streaks each in the wipe test, three of which were on the average sufficiently weak that they probably would not affect visibility under ordinary driving conditions.

EXAMPLE 16

A number of wiper blades were coated using the same styrene-butadiene rubber solution as was used in Example 14. The solution consisted of 18.75 grams per liter of SBR 1503 and 2.35 cubic centimeters per liter of di-tert-butyl-peroxide. The solvent was a mixture of methyl ethyl ketone and toluene containing 54.5% methyl ethyl ketone by volume. The coatings were applied by spraying. After curing at 80° C. for 1 hour to remove solvent and to cure the rubber coatings, the thickness of the coating was measured and was found to be in the range from about $25 \times 10^{-5}$ to $60 \times 10^{-5}$ cm. These wiper blades and a number of uncoated wiper blades from the same lot of blades were abraded against a dry windshield for 100 wipe cycles. Wipe given by the blades was tested in the wipe test. The uncoated blades gave five times as many streaks as did the coated blades. A number of additional wiper blades were coated using the solution described above. The coatings were again applied by spraying. After drying to remove solvent and to cure the rubber coatings, the thickness of the coating was measured and was found to be about $45 \times 10^{-5}$ cm. These wiper blades and a number of uncoated wiper blades from the same lot fo blades were tested in the wipe test. The uncoated blades gave 2.5 times as many streaks as did the coated blades. Both the coated and uncoated blades were abraded for 100 wipe cycles on a dry windshield. They were again tested in the wipe test. The uncoated blades now gave three times as many streaks as did the coated blades. Both the coated and uncoated blades were abraded for an additional 400 wipe cycles on a dry windshield. They were tested in the wipe test. The uncoated blades now gave four times as many streaks as did the coated blades.

EXAMPLE 17

A number of wiper blades were coated using the same styrene-butadiene rubber solution and curing agent as was used in Example 16. The solution consisted of 16.0 grams per liter of SBR 1503 and 4.0 cubic centimeters per liter of di-tert-butyl-peroxide. The solvent was a mixture of methyl ethyl ketone and toluene containing 58.0% methyl ethyl ketone by volume. The coatings were applied by spraying. After curing at 80° C. for 1 hour to remove solvent and to cure the rubber coatings, the thickness of the coating was measured and was found to be in the range from about $65 \times 10^{-5}$ cm. to $250 \times 10^{-5}$ cm. These wiper blades and a number of uncoated wiper blades from the same lot of blades were abraded against a dry windshield for 100 wipe cycles. Wipe given by the blades was tested in the wipe test. The uncoated blades had five times as many streaks as did the coated blades. A number of additional wiper blades were coated in the same manner and were found to have a coating thickness in the range of $35 \times 10^{-5}$ cm. to $60 \times 10^{-5}$ cm. After abrading the coated and uncoated blades from the same lot of blades for 100 cycles on a dry windshield, they were tested in the wipe test. The uncoated blades had five times as many streaks as did the coated blades. A number of additional wiper blades were coated using the solution described above. The coatings were again applied by spraying. After drying to remove solvent and to cure the rubber coatings, the thickness of the coating was measured and was found to be about $80 \times 10^{-5}$ cm. These wiper blades and a number of uncoated blades from the same lot of blades were tested in the wipe test. The uncoated blades had three times as many streaks as did the coated blades. Both the coated and uncoated blades were abraded for 100 wipe cycles on a dry windshield. They were again tested in the wiper test. The uncoated blades had 3.5 times as many streaks as did the coated blades. Both the coated and uncoated blades were braded for an additional 400 wipe cycles on a dry windshield. They were again tested in the wipe test. The uncoated blades were found to have 5.5 times as many streaks as did the coated blades.

EXAMPLE 18

A number of wiper blades were coated using a styrene-butadiene rubber solution. The solution consisted of 19.9 grams per liter of SBR 1503, 2.49 grams per liter of Cure Agent C, 1.00 cubic centimeters per liter of Activator A and 4.49 grams per liter of Micro 150 - graphite (available from Asbury Graphite Mills of Asbury, N.J.). The solvent was a mixture of methyl ethyl ketone and toluene containing 58.5% methyl ethyl ketone by volume. The coatings were applied by spraying. After curing at 80° C. for 1 hour to remove solvent and to cure the rubber coatings, the thickness of the coating was measured and was found to be in the range from about $55 \times 10^{-5}$ cm. to $95 \times 10^{-5}$ cm. These wiper blades and uncoated wiper blades from the same lot of blades were tested in the wipe test. The uncoated blades gave 3.5 times as many streaks as did the coated blades. Both the coated and uncoated blades were abraded for 100 wipe cycles on a dry windshield. They were again tested in the wipe test. The uncoated blades now gave 8.5 times as many streaks as did the coated blades. Both the coated and uncoated blades were abraded for an additional 400 wipe cycles on a dry windshield. They were tested in the wipe test. The uncoated blades gave seven times as many streaks as did the coated blades.

A number of additional wiper blades were coated using the solution described above. The coating was again applied by spraying after drying to remove solvent and to cure the rubber coatings, the thickness of the coating was measured and was found to be about $80 \times 10^{-5}$ cm. These wiper blades and a number of uncoated wiper blades from the same lot of blades were tested in the wipe test. The uncoated blades gave 2.5 times as many streaks as did the coated blades. Both the coated and uncoated blades were abraded for 100 wipe cycles on a dry windshield. They were again tested in the wipe test. The uncoated blades now gave four times as many streaks as did the coated blades. Both the coated and uncoated blades were abraded for an additional 400 wipe cycles on a dry windshield. They were tested in the wipe test. The uncoated blades now gave 5.7 times as many streaks as did the coated blades.

EXAMPLE 19

A number of wiper blades were coated using a styrene-butadiene rubber solution. The solution consisted of 15.95 grams per liter of SBR 1503, 1.99 grams per liter of Cure Agent C, 0.80 cubic centimeters per liter of Activator A and 3.59 grams per liter of semireinforcing furnace black. The solvent was a mixture of methyl ethyl ketone and toluene containing 58.0% methyl ethyl ketone by volume. The coatings were applied by spraying. After curing at 80° C. for 1 hour to remove solvent and to cure the rubber coatings, the thickness of the coating was measured and was found to be in the range from about $30 \times 10^{-5}$ cm. to $60 \times 10^{-5}$ cm. These wiper blades and uncoated wiper blades from the same lot of blades were tested in the wipe test. The uncoated blades gave three times as many streaks as did the coated blades. Both the coated and uncoated blades were abraded for 100 wipe cycles on a dry windshield. They were again tested in the wipe test. The uncoated blades now gave 5 times as many streaks as did the coated blades. Both the coated and uncoated blades were abraded for an additional 400 wipe cycles on a dry windshield. They were tested in the wipe test. The uncoated blades gave 4.5 times as many streaks as did the coated blades.

EXAMPLE 20

A number of wiper blades were coated using a styrene-butadiene rubber solution. The solution consisted of 15.75 grams per liter of SBR 1503, 1.97 grams per liter of Cure Agent C, 0.79 cubic centimeters per liter of Activator A and 28.4 grams per liter of Micro 150. The solvent was a mixture of methyl ethyl ketone and toluene containing 58.0% methyl ethyl ketone by volume. The coatings were applied by spraying. After curing at 80° C. for 1 hour to remove solvent and to cure the rubber coatings, the thickness of the coating was measured and was found to be in the range from about 35 × $10^{-5}$ cm. to 95 × $10^{-5}$ cm. These wiper blades and uncoated wiper blades from the same lot of blades were tested in the wipe test. The uncoated blades gave 1.5 times as many streaks as did the coated blades. Both the coated and uncoated blades were abraded for 100 wipe cycles on a dry windshield. They were again tested in the wipe test. The uncoated blades now gave two times as many streaks as did the coated blades. Both the coated and uncoated blades were abraded an additional 400 wipe cycles on a dry windshield. They were tested in the wipe test. The uncoated blades gave 1.8 times as many streaks as did the coated blades. In addition to the reduction in number of streaks, another outstanding feature of this coating was that it significantly reduced the intensity of patches of water on the windshield left by the wiper blades in the vicinity of the holder yokes. Patching differs from streaking in that patching is used to define relatively wide swaths of water whereas streaking defines quite narrow swaths. The two phenomena, if not the specific terms, are very well known to those skilled in the art and to motor vehicle operators in general.

A number of additional wiper blades were coated using the solution described above. The coating was again applied by spraying. After drying to remove solvent and to cure the rubber coatings, the thickness of the coating was measured and was found to be about 50 × $10^{-5}$ cm. These wiper blades and a number of uncoated wiper blades from the same lot of blades were tested in the wipe test. The uncoated blades gave 2.7 times as many streaks as did the coated blades. Both the coated and uncoated blades were abraded for 100 wipe cycles on a dry windshield. They were again tested in the wipe test. The uncoated blades now gave 3.2 times as many streaks as did the coated blades. Both the coated and uncoated blades were abraded for an additional 400 wipe cycles on a dry windshield. They were tested in the wipe test. The uncoated blades now gave 3.0 times as many streaks as did the coated blades. Again a second outstanding feature of this coating was its effectiveness in reducing the intensity of patches of water on the windshield left by the wiper blades in the vicinity of the holder yokes.

EXAMPLE 21

A number of wiper blades were coated using a styrene-butadiene rubber solution. The solution consisted of 15.75 grams per liter of SBR 1503, 1.97 grams per liter of Cure Agent C, 0.79 cubic centimeters per liter of Activator A and 28.4 grams per liter of Micro 150. The solvent was a mixture of methyl ethyl ketone and toluene containing 58.0% methyl ethyl ketone by volume. The coatings were applied by spraying. The blades were given a second coating using a similar solution but without graphite. The solution consisted of 22.8 grams per liter of SBR 1503, 2.85 grams per liter of Cure Agent C and 1.14 cubic centimeters per liter of Activator A. The solvent was a mixture of methyl ethyl ketone and toluene containing 58.5% methyl ethyl ketone by volume. The coatings were applied by spraying. After curing at 80° C. for 1 hour to remove solvent and to cure the rubber coatings, the thickness of the coating was measured and was found to be in the range from about 130 × $10^{-5}$ cm to 140 × $10^{-5}$ cm. These wiper blades and uncoated wiper blades from the same lot of blades were tested in the wipe test. The uncoated blades gave 1.5 times as many streaks as did the coated blades. Both the coated and uncoated blades were abraded for 100 wipe cycles on a dry windshield. They were again tested in the wipe test. The uncoated blades now gave 5 times as many streaks as did the coated blades. Both the coated and uncoated blades were abraded an additional 400 wipe cycles on a dry windshield. The were tested in the wipe test. The uncoated blades gave five times as many streaks as did the coated blades.

EXAMPLE 22

A number of wiper blades were coated using a styrene-butadiene rubber solution. The solution consisted of 15.75 grams per liter of SBR 1503, 1.97 grams per liter of Cure Agent C, 0.79 cubic centimeters per liter of Activator A and 28.4 grams per liter of Micro 150. The solvent was a mixture of methyl ethyl ketone and toluene containing 58.0% methyl ethyl ketone by volume. The coatings were applied by spraying. The blades were given a second coating using a similar solution. In this case the solution consisted of 19.9 grams per liter of SBR 1503, 2.49 grams per liter of Cure Agent C, 1.00 cubic centimeters per liter of Activator A and 4.49 grams per liter of Micro 150. The solvent was a mixture of methyl ethyl ketone and toluene containing 58.5% methyl ethyl ketone by volume. The coatings were applied by spraying. After curing at 80° C. for 1 hour to remove solvent and to cure the rubber coatings, the thickness of the coating was measured and was found to be in the range from about 90 × $10^{-5}$ cm to 170 × $10^{-5}$ cm. These wiper blades and uncoated wiper blades from the same lot of blades were tested in the wipe test. The uncoated blades gave three times as many streaks as did the coated blades. Both the coated and uncoated blades were abraded for 100 wipe cycles on a dry windshield. They were again tested in the wipe test. The uncoated blades now gave 5.7 times as many streaks as did the coated blades. Both the coated and uncoated blades were abraded an additional 400 wipe cycles on a dry windshield. They were tested in the wipe test. The uncoated blades gave 7 time as many streaks as did the coated blades.

EXAMPLE 23

A wiper blade which had not been treated with chlorine to reduce surface friction was coated with a styrene-butadiene rubber solution containing an organic sulfur curing system and zinc oxide. The solution consisted of 22.8 grams per liter of SBR 1503, 2.85 grams per liter of Cure Agent C and 1.14 cubic centimeters per liter of Activator A. The solvent was a mixture of methyl ethyl ketone and toluene containing 58.5% methyl ethyl ketone by volume. Before coating the blade had a coefficient of friction according to Friction Test CFRP 113 of about 2.8. The coating was applied by spraying. After curing at 80° C. for 1 hour to remove solvent, the thickness of the coating was measured and was found to be about $80 \times 10^{-5}$ cm. This wiper blade and a similar wiper blade from the same lot which also had not been treated with chlorine were graphited. The blades were then cut and tested in the wipe test. While the coated blade performed considerably better than the uncoated blade in that it had six times fewer streaks, it was also found that both blades wore out very quickly and were not at all practical from a commercial point of view. More particularly, the blades had disintegrated to the point of complete nonusability after less than four hours of use on a dry windshield, a totally unacceptable life span.

It will be understood that the claims are intended to cover all changes and modifications of the preferred embodiment of the invention, herein chosen for the purpose of illustration, which do not constitute departures from the spirit and scope of the invention.

What is claimed is:

1. A flexible windshield wiper blade, the basic blade of which has a coefficient of friction on at least the sides of the lip of the blade of no greater than about 2.1 according to Friction Test CFRP 113, said basic blade being selected from the group consisting of those blades which inherently have a coefficient of friction of no greater than about 2.1, those blades which have a coefficient of friction above 2.1 and which have been treated to reduce their coefficient of friction so that it is no greater than 2.1, and those blades which have a coefficient of friction above 2.1 which have been coated to reduce their coefficient of friction so that it is no greater than 2.1, at least one coating on said sides of the lip extending all the way to the lip edge, said at least one coating having a coefficient of friction greater than the coefficient of friction of said surface of said basic blade and said coating being selected from the group consisting of those elastomeric and plastic materials having a Young's modulus of from about $10^6$ to about $10^{11}$ dynes/cm$^2$, said coating being of a thickness effective to reduce the number of streaks the coated blade will give in Wipe Test WT-1 as compared to the number of streaks given by said basic blade.

2. The wiper blade of claim 1 where said coefficient of friction is no greater than about 1.5.

3. The wiper blade of claim 1 wherein said coefficient of friction is no greater than about 1.0.

4. The wiper blade of claim 1 wherein the basic wiper blade has a hardened surface.

5. The wiper blade of claim 4 wherein the surface is hardened by the application of a polymeric film thereto.

6. The wiper blade of claim 4 wherein the surface has been hardened by treatment with a halogen.

7. The wiper blade of claim 6 wherein the halogen is chlorine.

8. The wiper blade of claim 1 wherein the coating is softer than the surface of the basic blade.

9. The wiper blade of claim 1 wherein the coating thickness is from about 2 to about 20 microns.

10. The wiper blade of claim 1 wherein the basic blade is composed of at least 50% polyisoprene.

11. The wiper blade of claim 1 wherein the coating includes a finely divided material.

12. The wiper blade of claim 11 wherein the finely divided material is selected from the group consisting of graphite, titanium dioxide, carbon black and molybdenum disulfide.

13. The wiper blade of claim 1 further including a finely divided material on said coating.

14. A process of forming an improved flexible windshield wiper blade comprising the application to a basic windshield wiper blade which has a coefficient of friction on at least the sides of the lip of no greater than about 2.1 according to Friction Test CFRP 113, said basic blade being selected from the group consisting of those blades which inherently have a coefficient of friction of no greater than about 2.1, those blades which have a coefficient of friction above 2.1 and which have been treated to reduce their coefficient of friction so that it is no greater than 2.1, and those blades which have a coefficient of friction above 2.1 which have been coated to reduce their coefficient of friction so that it is no greater than 2.1, at least one coating on said sides of the lip extending all the way to the lip edge, said at least one coating having a coefficient of friction greater than the coefficient of friction of said surface of said basic blade and said coating being selected from the group consisting of those elastomeric and plastic materials having a Young's modulus of from about $10^6$ to about $10^{11}$ dynes/cm$^2$, said coating being applied in a thickness effective to reduce the number of streaks of the coated blade as compared to the uncoated blade when each is tested in Wipe Test WT-1.

15. The process of claim 14 further including the step of hardening the surface of the windshield wiper blade before application of the coating.

16. The process of claim 15 wherein the surface is hardened by the application of a polymeric film thereto.

17. The process of claim 15 wherein the surface is hardened by treatment with a halogen.

18. The process of claim 17 wherein the halogen is chlorine.

19. The process of claim 14 wherein the coating is softer than the surface of the basic blade.

20. The process of claim 14 wherein the coating thickness is from about 2 to about 20 microns.

21. The process of claim 14 further including treatment of the coating with a finely divided material.

22. The process of claim 21 wherein the finely divided material is selected from group consisting of graphite, titanium dioxide, carbon black, and molybdenum disulfide.

23. The process of claim 14 wherein the coating includes a finely divided material.

* * * * *

UNITED STATES PATENT AND TRADEMARK OFFICE
CERTIFICATE OF CORRECTION

PATENT NO. : 4,045,838
DATED : September 6, 1977
INVENTOR(S) : Raymond P. Porter It is certified that error appears in the above-identified patent and that said Letters Patent are hereby corrected as shown below:

Column 1, line 38, after "wide", the word --variety-- was omitted.

Column 5, line 41, "Paint Striper" should be in quotes.

Column 6, line 42, "be" should read --been--.

Column 6, line 42, "coat" should read --coated--.

Column 7, line 2, the --x-- between "25" and "$10^{-5}$cm." was omitted.

Column 7, line 50, "ws" should read --was--.

Column 8, line 38, after "from", --60 x $10^{-5}$cm. to-- was omitted.

UNITED STATES PATENT AND TRADEMARK OFFICE
CERTIFICATE OF CORRECTION

PATENT NO. : 4,045,838
DATED : September 6, 1977
INVENTOR(S) : Raymond P. Porter It is certified that error appears in the above—identified patent and that said Letters Patent are hereby corrected as shown below:

Column 9, line 20, "fo" should read --of--.

Column 9, line 67, "wiper" should read --wipe--.

Column 13, line 49, "where" should read --wherein--.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*